(12) United States Patent
Fukuhara et al.

(10) Patent No.: US 10,829,661 B2
(45) Date of Patent: Nov. 10, 2020

(54) AQUATIC ORGANISM REPELLENT PAINT COMPOSITION

(71) Applicants: KURARAY CO., LTD., Kurashiki (JP); FUJI SILYSIA CHEMICAL LTD., Kasugai (JP); Akio Kameyama, Okayama (JP)

(72) Inventors: Tadahito Fukuhara, Kurashiki (JP); Keisuke Morikawa, Houston, TX (US); Mitsuteru Ogawa, Nagoya (JP); Mutsuhiro Ito, Ena (JP); Yoshio Nakano, Setagaya-ku (JP); Akio Kameyama, Okayama (JP)

(73) Assignees: KURARAY CO., LTD., Kurashiki (JP); FUJI SILYSIA CHEMICAL LTD., Kasugai (JP)

( * ) Notice: Subject to any disclaimer, the term of this patent is extended or adjusted under 35 U.S.C. 154(b) by 32 days.

(21) Appl. No.: 16/316,823

(22) PCT Filed: Jul. 5, 2017

(86) PCT No.: PCT/JP2017/024717
§ 371 (c)(1),
(2) Date: Jan. 10, 2019

(87) PCT Pub. No.: WO2018/012381
PCT Pub. Date: Jan. 18, 2018

(65) Prior Publication Data
US 2019/0249028 A1 Aug. 15, 2019

(30) Foreign Application Priority Data

Jul. 11, 2016 (JP) .................. 2016-136901

(51) Int. Cl.
| | | |
|---|---|---|
| *C09D 129/04* | (2006.01) | |
| *C09D 5/14* | (2006.01) | |
| *C08K 3/22* | (2006.01) | |
| *C08K 3/36* | (2006.01) | |
| *C09D 5/16* | (2006.01) | |

(52) U.S. Cl.
CPC .............. *C09D 129/04* (2013.01); *C08K 3/22* (2013.01); *C08K 3/36* (2013.01); *C09D 5/14* (2013.01); *C09D 5/1618* (2013.01); *C09D 5/1668* (2013.01); *C08K 2003/2227* (2013.01)

(58) Field of Classification Search
None
See application file for complete search history.

(56) References Cited

U.S. PATENT DOCUMENTS

| | | | | | |
|---|---|---|---|---|---|
| 4,239,543 | A | * | 12/1980 | Beasley | C09D 11/30 106/31.43 |
| 4,381,946 | A | * | 5/1983 | Uehara | C09D 11/30 106/31.58 |
| 4,769,398 | A | * | 9/1988 | Kanda | C09D 5/165 523/122 |
| 4,781,758 | A | * | 11/1988 | Gendler | C09D 11/38 106/31.47 |
| 6,458,878 | B1 | * | 10/2002 | Tsuboi | C09D 5/1668 524/432 |
| 2004/0192807 | A1 | * | 9/2004 | Kim | B41M 7/0036 523/160 |
| 2007/0272119 | A1 | * | 11/2007 | Ichinose | C09D 201/00 106/16 |
| 2009/0170980 | A1 | * | 7/2009 | Ghyzel | C08K 5/1545 524/27 |
| 2010/0269731 | A1 | * | 10/2010 | Tofte Jespersen | A61K 9/48 106/18.32 |
| 2011/0003130 | A1 | * | 1/2011 | Marchet | C09C 1/407 428/220 |
| 2017/0226345 | A1 | | 8/2017 | Danjo | |
| 2018/0223051 | A1 | | 8/2018 | Ogawa et al. | |
| 2019/0249028 | A1 | * | 8/2019 | Fukuhara | C09D 129/04 |

FOREIGN PATENT DOCUMENTS

| | | |
|---|---|---|
| CN | 104031275 A | 9/2014 |
| EP | 0 506 470 A1 | 9/1992 |
| GB | 2435602 B | 11/2010 |
| JP | 4-337369 A | 11/1992 |
| JP | 5-65431 A | 3/1993 |
| JP | 7-252110 A | 10/1995 |
| JP | 11-80615 A | 3/1999 |
| JP | 2000-265107 A | 9/2000 |
| JP | 2002-327064 A | 11/2002 |
| JP | 2003-147257 A | 5/2003 |
| WO | WO 2005/116155 A1 | 12/2005 |
| WO | WO 2006/077738 A1 | 7/2006 |
| WO | WO 2009/062975 A1 | 5/2009 |
| WO | WO 2016/021071 A1 | 2/2016 |
| WO | WO 2017/010459 A1 | 1/2017 |

OTHER PUBLICATIONS

Extended European Search Report dated Dec. 12, 2019 in corresponding European Patent Application No. 17827509.5, citing documents AA, AO and AX therein, 8 pages.

T. Murosaki et al., "Antifouling Properties of Tough Gels Against Barnacles in a Long-term Marine Environment Experiment", Biofouling: The Journal of Bioadhesion and Biofilm Research, vol. 25, No. 7, XP55648782, Oct. 2009, pp. 657-666 and cover page.

International Search Report dated Aug. 1, 2017 in PCT/JP2017/024717 filed Jul. 5, 2017.

\* cited by examiner

*Primary Examiner* — Peter A Salamon

(74) *Attorney, Agent, or Firm* — Oblon, McClelland, Maier & Neustadt, L.L.P.

(57) ABSTRACT

The present invention provides an aquatic organism repellent paint composition having good dispersion stability and capable of maintaining the repellent effect on aquatic organisms over a long time. The present invention relates to an aquatic organism repellent paint composition containing: a vinyl alcohol polymer (A) having a degree of saponification of more than 65 mol % and less than 88 mol %; an inorganic oxide (B); and a solvent (C).

20 Claims, No Drawings

AQUATIC ORGANISM REPELLENT PAINT COMPOSITION

TECHNICAL FIELD

The present invention relates to a paint composition having a good aquatic organism repellent effect.

BACKGROUND ART

Some aquatic organisms attach to underwater structures such as ships and fishing nets and exert a harmful effect on the underwater structures. For example, aquatic organisms such as barnacles, mussels, and hydroids sometimes attach to and grow on the underwater part of ships. This increases the surface roughness of the ship bottoms and brings disadvantages such as a decrease in ship speed and an increase in fuel consumption. As a countermeasure against such disadvantages, a paint preventing attachment of aquatic organisms is applied to underwater structures.

As such a method for preventing attachment of aquatic organisms, for example, Patent Literature 1 describes the use of a composition containing an antifouling metal component such as copper suboxide. However, the use of such a composition causes problems of: natural environment pollution by, for example, spread and elution of the metal component after application of the composition to underwater structures such as ship bottoms as a paint; and consumption of valuable metal resources such as toper in production. In Patent Literature 2, the aquatic organism repellent effect is exercised by forming a tough coating using a polymer compound into which a crosslinking reactive group is introduced, tin, and a kind of a curing agent. However, this is problematic in terms of the use of tin which is harmful and a complicated operation performed to form the coating and involving, for example, the use of the curing agent.

CITATION LIST

Patent Literature

Patent Literature 1: JP 2000-265107 A
Patent Literature 2: JP 2002-327064 A

SUMMARY OF INVENTION

Technical Problem

The present invention aims to provide an aquatic organism repellent paint composition having good dispersion stability and capable of maintaining the repellent effect on aquatic organisms over a long time. Moreover, the present invention aims to provide an aquatic organism repellent paint composition substantially free of any compound including the copper element and/or zinc element, the aquatic organism repellent paint composition having no risk of environmental pollution. Furthermore, the present invention aims to provide an aquatic organism repellent paint composition capable of being easily produced without using a curing agent and catalyst.

Solution to Problem

The present inventors have conducted a detailed study to solve the above problems and found that an aquatic organism repellent paint composition containing: a vinyl alcohol polymer having a degree of saponification within a predetermined range; an inorganic oxide; and a solvent can solve the above problems. The present inventors have conducted a further study based on the finding and completed the present invention.

That is, the present disclosure relates to the following inventions.

[1] An aquatic organism repellent paint composition, containing: a vinyl alcohol polymer (A) having a degree of saponification of more than 65 mol % and less than 88 mol %; an inorganic oxide (B); and a solvent (C).

[2] The aquatic organism repellent paint composition according to [1], wherein a 4 mass % aqueous solution of the vinyl alcohol polymer (A) has a viscosity of more than 2.5 mPa·s and less than 150 mPa·s at 20° C.

[3] The aquatic organism repellent paint composition according to [1] or [2], wherein a mass ratio (A)/(B) between the vinyl alcohol polymer (A) and the inorganic oxide (B) is 10/90 to 90/10.

[4] The aquatic organism repellent paint composition according to any one of [1] to [3], wherein the inorganic oxide (B) includes aluminum oxide or silicon oxide.

[5] The aquatic organism repellent paint composition according to any one of to [4], wherein the solvent (C) has a boiling point of 25° C. or more and less than 250° C.

[6] The aquatic organism repellent paint composition according to any one of [1] to [5], wherein the content of a copper element and/or a zinc element is less than 10 ppm.

[7] The aquatic organism repellent paint composition according to any one of [1] to [6], containing a composite (X), wherein the composite (X) includes the vinyl alcohol polymer (A) and the inorganic oxide (B).

[8] An aquatic organism repellent coating, including a composite (X) including: a vinyl alcohol polymer (A) having a degree of saponification of more than 65 mol % and less than 88 mol %; and an inorganic oxide (B).

Advantageous Effects of Invention

The present invention can provide the aquatic organism repellent paint composition having good dispersion stability and capable of maintaining the repellent effect on aquatic organisms over a long time. Moreover, the aquatic organism repellent paint composition of the present invention is substantially free of any compound including the copper element and/or zinc element and thus has no risk of environmental pollution. Furthermore, the aquatic organism repellent paint composition of the present invention is capable of being easily produced without using a curing agent and catalyst.

The term "repellent effect on aquatic organisms" as used herein not only includes the effect of repelling aquatic organisms, but also includes the effect of preventing attachment of aquatic organisms to underwater structures to which the aquatic organism repellent paint composition is applied because the paint composition is slowly eluted in water.

DESCRIPTION OF EMBODIMENTS

Hereinafter, the present invention will be described in detail. An aquatic organism repellent paint composition (which may hereinafter be abbreviated as "paint composition") of the present invention contains: a vinyl alcohol polymer (A) having a degree of saponification of more than 65 mol % and less than 88 mol %; an inorganic oxide (B); and a solvent (C). A composite (X) layer including the vinyl alcohol polymer (A) and inorganic oxide (B) and having a good aquatic organism repellent effect can be formed on an underwater structure by applying the paint composition to the underwater structure and removing the solvent (C) by drying. It is important that slow elution from the composite (X) layer in water prevents aquatic organisms from creating a footing for attachment. Generally, when the vinyl alcohol polymer (A) having too high a degree of saponification is used alone, inclusion thereof in a coating results in a large amount of hydrogen bonding between molecules and high crystallinity; therefore, it is inferred that when used alone, the vinyl alcohol polymer (A) having a degree of saponification decreased to some extent is likely to be eluted more in water. However, a surprising result is obtained by forming the composite (X) using the vinyl alcohol polymer (A) and inorganic oxide (B): Inclusion of the vinyl alcohol polymer (A) having a degree of saponification decreased to some extent results in a greater decrease in the rate of elution in water than inclusion of the vinyl alcohol polymer (A) having a high degree of saponification. Herein, the upper limits and lower limits of value ranges (ranges of, for example, the contents of components, values calculated for components, and values of physical properties) can be combined appropriately. Herein, the description of the paint composition is also applicable to an aquatic organism repellent coating capable of being obtained by removing the solvent (C) from the aquatic organism repellent paint composition by drying, as long as no problem arises in particular.

[Vinyl Alcohol Polymer (A)]

It is important for the vinyl alcohol polymer (A) used in the present invention to have a degree of saponification of more than 65 mol % and less than 88 mol % in terms of preparation of the paint composition, dispersion stability, and post-application performance. The vinyl alcohol polymer (A) preferably has a degree of saponification of more than 65 mol % and 85 mol % or less and more preferably more than 65 mol % and 83 mol % or less so that slow release from the composite (X) can be achieved over a longer time when the vinyl alcohol polymer (A) forms the composite (X) with the inorganic oxide (B). If the degree of saponification is 65 mol % or less, the water solubility of the vinyl alcohol polymer (A) may be so low that it is difficult to prepare the paint and, additionally, problems such as failure to exercise the aquatic organism repellent effect may occur. If the degree of saponification is 88 mol % or more, the dispersion stability of the paint may decrease to cause precipitation or failure to exercise the aquatic organism repellent effect.

The degree of saponification of the vinyl alcohol polymer (A) can be determined by measurement according to JIS K 6726 (1994).

The vinyl alcohol polymer (A) preferably has a 4% aqueous solution viscosity of more than 2.5 mPa·s and less than 150 mPa·s and more preferably more than 3.0 mPa·s and less than 120 mPa·s at 20° C. in terms of handleability, preparation of the paint, and dispersion stability. This viscosity is of a 4 mass % aqueous solution at 20° C., and can be measured by the method specified in JIS K 6726 (1994). The measurement apparatus is, for example, a B-type rotary viscometer.

The weight-average molecular weight/number-average molecular weight (Mw/Mn) of the vinyl alcohol polymer (A) is preferably 5 or less and more preferably 4 or less in terms of production efficiency.

The vinyl alcohol polymer (A) is preferably produced by polymerizing a vinyl ester monomer by radical polymerization, which is followed by saponification. Examples of the vinyl ester monomer include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, and vinyl benzoate. Vinyl acetate is most preferred among these. The saponification method may be a known method and employs an alkaline saponification catalyst or acid saponification catalyst. Additionally, known saponification conditions can be used.

The vinyl alcohol polymer (A) may be an unmodified vinyl alcohol polymer, or may be a modified vinyl alcohol polymer synthesized, for example, by copolymerization with the above vinyl ester monomer as long as there is no departure from the gist of the present invention. Examples of a monomer included in the modified vinyl alcohol polymer include: α-olefin such as ethylene, propylene, n-butene, and isobutylene; acrylic acid and its salts; acrylamide; acrylamide derivatives such as N-methylacrylamide, N-ethylacrylamide, N,N-dimethylacrylamide, diacetone acrylamide, acrylamidepropanesulfonic acid and its salts, acrylamide propyldimethylamine and its salts or quaternary salts, and N-methylol acrylamide and its derivatives; methacrylamide; methacrylamide derivatives such as N-methylmethacrylamide, N-ethylmethacrylamide, methacrylamide propanesulfonic acid and its salts, methacrylamide propyldimethylamine and its salts or quaternary salts, and N-methylolmethacrylamide and its derivatives; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether, and 2,3-diacetoxy-1-vinyloxypropane; nitriles such as acrylonitrile and methacrylonitrile; vinyl halides such as vinyl chloride and vinyl fluoride; vinylidene halides such as vinylidene chloride and vinylidene fluoride; allyl compounds such as allyl acetate, 2,3-diacetoxy-1-allyloxypropane, and allyl chloride; unsaturated dicarboxylic acids such as maleic acid, itaconic acid, and fumaric acid, and their salts or esters; vinylsilyl compounds such as vinyltrimethoxysilane; and isopropenyl acetate. The content of the modified group(s) is preferably 0.1 to 10 mol %, more preferably 0.1 to 8.0 mol %, and even more preferably 0.1 to 5.0 mol %. The vinyl alcohol polymer (A) can be easily produced because a step in which, for example, a crosslinked structure is formed using a catalyst is unnecessary.

The vinyl alcohol polymer (A) may be used alone or in combination.

[Inorganic Oxide (B)]

The inorganic oxide (B) used in the present invention is particles of, for example, magnesium oxide, calcium oxide, barium oxide, phosphorus oxide, boron oxide, aluminum oxide (alumina), and silicon oxide. Among these, particles including aluminum oxide or silicon oxide are preferred in terms of performance. As silicon oxide, silicon dioxide (silica) is preferred. Examples of silica include amorphous silica (dry silica and wet silica). Examples of the shape of the inorganic oxide (B) include non-spherical and spherical shapes. Examples of the non-spherical inorganic oxide (B) include non-spherical silica. Non-spherical silica is three-dimensional colloidal silica obtained by gelation of silicic acid and is amorphous, porous, and non-spherical. When observed with a scanning electron microscope, non-spherical silica is porous silica having a three-dimensional steric shape. Non-spherical silica is neither flat nor spherical.

The inorganic oxide (B) may be used alone or in combination.

The average particle diameter of the inorganic oxide (B) is preferably, for example, 0.10 to 100 μm and more preferably 1.10 to 50 μm. Herein, the average particle diameter can be determined, for example, by a laser diffraction-scattering method. Specifically, the average particle diameter can be measured, for example, with a laser diffraction particle size analyzer (SALD-2300, manufactured by Shimadzu Corporation).

A commercially-available product may be used as the inorganic oxide (B). Examples of the commercially-available product include: non-spherical silica such as Sylysia series (manufactured by Fuji Silysia Chemical Ltd.), such as Sylysia 310P, Sylysia 320, and Sylysia 350, and Adsolider (manufactured by Freund Corporation); and aluminum oxide (alumina) such as A-21, A-26, A-210, A-260N, and AN-210 (manufactured by Sumitomo Chemical Company Limited).

[Solvent (C)]

The solvent (C) used in the present invention is, for example, but not particularly limited to, hydrocarbons such as toluene, xylene, ethylbenzene, cyclopentane, octane, heptane, cyclohexane, and white spirit; ethers such as dioxane, tetrahydrofuran, ethylene glycol monomethyl ether, ethylene glycol monoethyl ether, ethylene glycol monobutyl ether, ethylene glycol dibutyl ether, diethylene glycol monomethyl ether, and diethylene glycol monoethyl ether; esters such as butyl acetate, propyl acetate, benzyl acetate, ethylene glycol monomethyl ether acetate, and ethylene glycol monoethyl ether acetate; ketones such as ethyl isobutyl ketone and methyl isobutyl ketone; and alcohols such as n-butanol and propyl alcohol. Among these, solvents having a boiling point of more than 25° C. and less than 250° C. are preferred in terms of ease of application and drying of the paint.

The solvent (C) may be used alone or in combination.

The paint composition of the present invention contains the vinyl alcohol polymer (A), inorganic oxide (B), and solvent (C). The method for producing the paint composition is not particularly limited. Examples of the method include: (1) a method in which powders of the vinyl alcohol polymer (A) and inorganic oxide (B) are directly added to the solvent (C); (2) a method in which to the vinyl alcohol polymer (A) melted at a high temperature around 200° C. to 230° C. is added the inorganic oxide (B) to form the composite (X), which is cooled, ground, and added to the solvent (C); (3) a method in which a suspension containing the inorganic oxide (B) added to an aqueous vinyl alcohol polymer (A) solution is repeatedly subjected to freezing and thawing to turn the suspension into a gel, which is added to the solvent (C) after ground to the composite (X); and (4) a method in which a suspension containing the inorganic oxide (B) added to an aqueous vinyl alcohol polymer (A) solution is dried and solidified to obtain dry solids, which are added to the solvent (C) after ground to the composite (X). Among these, the method (4) is preferred because the method (4) is easy and the vinyl alcohol polymer (A) and inorganic oxide (B) are likely to be mixed more homogenously.

Another embodiment of the paint composition of the present invention is a paint composition contains, as described above, the composite (X) including the vinyl alcohol polymer (A) and inorganic oxide (B). The formation of the composite (X) makes it possible to reduce the time-varying rate (%) of elution in water and achieve the aquatic organism repellent effect over a longer time. Yet another embodiment of the present invention is an aquatic organism repellent coating obtained by removing the solvent (C) from the paint composition by drying, the aquatic organism repellent coating including the composite (X) including: the vinyl alcohol polymer (A) having a degree of saponification of more than 65 mol % and less than 88 mol %; and the inorganic oxide (B).

The mass ratio (A)/(B) between the vinyl alcohol polymer (A) and inorganic oxide (B) in the paint composition of the present invention is not particularly limited. The mass ratio (A)/(B) is preferably 10/90 to 90/10, more preferably 20/80 to 80/20, and even more preferably 30/70 to 70/30 in terms of the dispersion stability of the paint. In a preferred embodiment of the present invention, the mass ratio (A)/(B) between the vinyl alcohol polymer (A) and inorganic oxide (B) is preferably within the above value range in the composite (X) because in that case, the aquatic organism repellent effect is exercised and slow release can be appropriately achieved.

[Compound Including Copper Element and/or Zinc Element]

The paint composition of the present invention is preferably substantially free of, for example, a copper compound and zinc compound conventionally used as aquatic organism repellent components. That is, in terms of an environmental impact, the content of the copper element and/or zinc element contained in the paint composition of the present invention is preferably as low as that of minute impurities, more preferably less than 10 ppm, even more preferably less than 5 ppm, and particularly preferably less than 3 ppm in the whole paint composition. The term "ppm" as used here means mass ppm.

The content of the copper element and/or the content of zinc element can be measured by a known element analysis method. Examples of the known element analysis method include ICP mass spectrometry (ICP-MS: Inductively Coupled Plasma Mass Spectrometry), ICP atomic emission spectrometry (ICP-AES: Inductively Coupled Plasma Atomic Emission Spectrometry), and atomic absorption spectrometry (AAS).

[Other Additives]

Additives such as a surfactant, pH adjuster, plasticizer, and pigment may be added, for example, to improve the stability of the paint and adjust the pH of the paint as long as there is no departure from the gist of the present invention. Each additive may be used alone, or two or more types of each additive may be used in combination. Additionally, when one or more of the additives are added, the resultant paint composition and aquatic organism repellent coating are preferably substantially free of the copper element and/or zinc element. Even when the copper element and/or zinc element is contained, the resultant paint composition and aquatic organism repellent coating more preferably contain the copper element and/or zinc element within the above value range in terms of an environmental impact.

Examples of the surfactant include, but are not particularly limited to, nonionic surfactants, cationic surfactants, anionic surfactants, amphoteric surfactants, fluorine-based surfactants, and silicone-based surfactants.

Examples of the nonionic surfactant include: ethers (such as polyoxyethylene alkyl ethers, polyoxyethylene alkyl allyl ethers, and polyoxyethylene alkyl phenyl ethers); esters (such as polyoxyethylene fatty acid esters, sorbitan fatty acid esters, polyoxyethylene sorbitan fatty acid esters, polyoxyethylene alkylamines, monoglycerin fatty acid esters, polyglycerin fatty acid esters, and sucrose fatty acid esters); amides (such as: fatty acid diethanolamides such as oleic acid diethanolamide and lauric acid diethanolamide; fatty acid monoethanolamides such as lauric acid monoethanolamide; and fatty acid monoisopropanolamides such as lauric acid monoisopropanolamide); and polyoxyethylene derivatives (such as oxyethylene oxypropylene block copolymers).

Examples of the cationic surfactant include: amine salts (such as N-acylaminoethyl diethylamine salts); and quaternary ammonium salts (such as alkyltrimethylammonium salts, dialkyldimethylammonium salts, alkoxyalkyltrimethylammonium salts, and alkylbenzyklimethylammonium salts).

Examples of the anionic surfactant include: carboxylic acid salts (such as carboxylic acid salts of higher fatty acids (12 to 18 carbon atoms), alkyl ether carboxylic acid salts, and fatty acid amide ether carboxylic acid salts); sulfuric acid ester salts (such as alkylsulfuric acid ester salts and polyoxyethylene alkylsulfuric acid ester salts); sulfonic acid salts (such as alkylsulfonic acid salts, alkylallylsulfonic acid salts, alkylamidesulfonic acid salts, dialkyl sulfosuccinic acid salts, alkylbenzenesulfonic acid salts, and alkylnaphthalenesulfonic acid salts); and phosphoric acid ester salts (such as alkylphosphoric acid ester salts, and polyoxyethylene alkyl ether phosphoric acid salts).

Examples of the fluorine-based surfactant include: perfluoroalkylsulfonic acid salts, perfluoroalkylcarboxylic acid salts, perfluoroalkylphosphoric acid esters, perfluoroalkyl ethylene oxide adducts, perfluoroalkyl betaines, and perfluoroalkylamine oxide compounds.

Examples of the amphoteric surfactant include: glycine salts (alkylglycine salts, carboxymethyl glycine salts, N-acylaminoethyl-N-2-hydroxyethyl glycine salts, alkylpolyamino polycarboxy glycine salts, alkylaminopropionic acid salts, alkyliminodipropionic acid salts, and N-acylaminoethyl-N-2-hydroxyethyl propionic acid salts); sulfobetaines; phosphobetaines; carboxybetaines (such as alkyl dimethylaminoacetic acid betaine, fatty acid amide propyldimethylaminoacetic acid betaine, and alkyl dihydroxyethylaminoacetic acid betaine); sulfonic acid salts (such as N-alkyl-N,N-dimethylammonium-N-propylsulfonic acid salts, N-alkyl-N,N-dimethylammonium-N-(2-hydroxypropyl)sulfonic acid salts, and N-fatty acid amide propyl-N,N-dimethylammonium-N-(2-hydroxypropyl)sulfonic acid salts).

Examples of the silicone-based surfactant include: polyether-modified silicone, amino-modified silicone, alcohol-modified silicone, alkylaralkylpolyether-modified silicone, epoxy polyether-modified silicone, mercapto-modified silicone, epoxy-modified silicone, sulfonic acid-modified silicone, carboxyl-modified silicone, phosphoric acid-modified silicone, ammonium salt-modified silicone, and sulfobetaine-modified silicone.

Examples of the pH adjuster include acidic compounds and basic compounds. Examples of the basic compound include: inorganic bases such as sodium carbonate, potassium carbonate, sodium hydrogen orthophosphate, sodium thiosulfate, and sodium tetraborate; and organic bases such as triethylamine, triethanolamine, dimethylethanolamine, and diethylethanolamine. Examples of the acidic compound include, but are not particularly limited to: inorganic acids such as hydrochloric acid and nitric acid; and organic acids such as citric acid and trisodium citrate.

Examples of the plasticizer include: phthalate ester plasticizers such as dioctyl phthalate, dimethyl phthalate, and dicyclohexyl phthalate; aliphatic dibasic acid ester plasticizers such as isobutyl adipate and dibutyl sebacate; glycol ester plasticizers such as diethylene glycol dibenzoate and pentaerythritol alkyl ester; phosphate ester plasticizers such as trichlene diphosphate and trichloroethyl phosphate; epoxy plasticizers such as epoxy soybean oil and octyl epoxystearate; organic tin plasticizers such as dioctyltin laurate and dibutyltin laurate; trioctyl trimellitate, and triacetylene.

The composite (X) preferably has a rate (%) of elution from the composite (X) in water of 80% or less, more preferably less than 60%, even more preferably 55% or less, and particularly preferably 50% or less at 20° C. on the 100th day after the start of stirring in water. The method for measuring the rate (%) of elution is as described below in EXAMPLES.

The composite (X) preferably has a rate (%) of elution from the composite (X) in water of 90% or less, more preferably less than 70%, even more preferably 65% or less, and particularly preferably 60% or less at 20° C. on the 200th day after the start of stirring in water. The method for measuring the rate (%) of elution is as described below in EXAMPLES.

The composite (X) preferably has a particle diameter of 1000 μm or less so that the paint composition applied to an underwater structure can form a uniform coating exercising the aquatic organism repellent effect. The particle diameter can be adjusted by grinding the composite (X) using a known grinder or crusher. From the result of measuring the particle size distribution using a Tyler standard metal sieve according to dry sieving specified in JIS Z 8815 (1994), the particle diameter is calculated using a Rosin-Rammler plot.

Examples of the underwater structure for which the paint composition of the present invention is used include ships, fishing gear (e.g., ropes, fishing nets, floats, and buoys), undersea tunnels, and port facilities.

The paint composition of the present invention can continuously prevent attachment of aquatic organisms such as sea lettuce, barnacles, mussels, hydroids, green laver, serpulae, oysters, and bugula neritina over a long time.

[Method for Applying Paint Composition]

The method for applying the paint composition of the present invention to an underwater structure is not limited. The paint composition may be sprayed using a spray or the like, or may be applied using a brush or the like.

The present invention encompasses embodiments obtainable by combining the above features in various manners within the technical scope of the present invention as long as the effect of the present invention can be obtained.

EXAMPLES

Next, the present invention will be described more specifically with Examples. The present invention is by no means limited by the following Examples and can be modified in various ways by those ordinarily skilled in the art within the technical scope of the invention. It should be noted that "part(s)" and "%" refer to "part(s) by mass" and "mass %", respectively, unless otherwise specified.

[Production of Composite (X-1)]

An amount of 5 parts of the vinyl alcohol polymer (A) having a degree of saponification of 80 mol % and a 4% viscosity (viscosity of a 4 mass % aqueous solution at 20° C.) of 32 mPa·s was added to 95 parts of distilled water and stirred at room temperature until fully dissolved. A 5% aqueous solution of the vinyl alcohol polymer (A) was thus obtained. An amount of 7.5 parts of non-spherical silica (having an average particle diameter of 3.9 μm and manufactured by Fuji Silysia Chemical Ltd., product name: Sylysia 350) as the inorganic oxide (B) was added to the resultant aqueous solution and dispersed by stirring at room temperature for 10 minutes. The resultant dispersion was put in a dryer at 110° C. to dry and solidify. The resultant dry solids are ground to have a particle diameter of 1000 μm or less. A composite (X-1) including the vinyl alcohol polymer (A) and inorganic oxide (B) was thus obtained.

The composite (X-1) obtained was added to the solvent (C) to obtain a paint composition, which was applied to an underwater structure. The solvent (C) was removed by drying to form, on the underwater structure, a composite (X-1) layer having the aquatic organism repellent effect. It is important that slow elution from the composite (X-1) layer in water prevents aquatic organisms from creating a footing for attachment. If too large an amount is eluted from the composite (X-1) layer in water, the absolute amount of the composite (X-1) layer having the good aquatic organism repellent effect decreases in a short time and the aquatic organism repellent effect is insufficient in the long run. If too small an amount is eluted from the composite (X-1) layer in water, the aquatic organism repellent effect is poor and thus a footing for attachment of aquatic organisms is likely to be created. Therefore, it is important that the composite (X-1) layer is slowly released over a long time in such an appropriate amount that the aquatic organism repellent effect can be exercised. Thus, the elution from the composite (X-1) layer in water was evaluated by the following method.

Rate (%) of elution=(solids (g) contained in liquid part obtained by centrifugation/mass (g) of vinyl alcohol polymer (A) included in composite (X))×100

[Production of Composites (X-2) to (X-11)]

Composites (X-2) to (X-11) were obtained in the same manner as the composite (X-1), except for changing the types and amounts of the vinyl alcohol polymer (A) and inorganic oxide (B) used. For the composite (X-10), a vinyl alcohol polymer having a degree of saponification of 50 mol % was used as the vinyl alcohol polymer (A). Probably because the degree of saponification was too low, the vinyl alcohol polymer did not dissolve in water and the viscosity thereof was unable to be measured. When the vinyl alcohol polymer (A) having too high a degree of saponification is used alone, inclusion thereof in a coating results in a large amount of hydrogen bonding between molecules and high crystallinity; therefore, it is inferred that when used alone, the vinyl alcohol polymer (A) having a degree of saponification decreased to some extent is likely to be eluted more in water. Table 1, however, shows a surprising result: By the formation of the composite (X) with the inorganic oxide (B), inclusion of the vinyl alcohol polymer (A) having a degree of saponification decreased to some extent results in a greater decrease in the rate of elution in water than inclusion of the vinyl alcohol polymer (A) having a high degree of saponification.

TABLE 1

| | Composite (X) | | | | Rate (%) of elution from | | | | |
|---|---|---|---|---|---|---|---|---|---|
| | Vinyl alcohol polymer (A) | | Inorganic oxide (B) | (A)/(B) (mass ratio) | composite (X) in water Stirring period (day) | | | | |
| | Degree of saponification (mol %) | 4% viscosity (mPa·s) | Brand[1] | | 1 | 7 | 56 | 100 | 200 |
| Composite (X-1) | 80 | 32 | Sylysia 350 | 40/60 | 5 | 10 | 36 | 41 | 46 |
| Composite (X-2) | 85 | 85 | Sylysia 350 | 40/60 | 7 | 14 | 41 | 49 | 60 |
| Composite (X-3) | 70 | 5.5 | Sylysia 350 | 40/60 | 23 | 35 | 41 | 44 | 47 |
| Composite (X-4) | 85 | 2.7 | Sylysia 350 | 40/60 | 8 | 17 | 45 | 59 | 70 |
| Composite (X-5) | 80 | 32 | A-21 | 40/60 | 2 | 9 | 27 | 35 | 40 |
| Composite (X-6) | 80 | 32 | Sylysia 350 | 80/15 | 10 | 20 | 40 | 60 | 68 |
| Composite (X-7) | 80 | 32 | Sylysia 350 | 5/95 | 30 | 42 | 61 | 75 | 90 |
| Composite (X-8) | 80 | 32 | — | 100/0 | 100 | — | — | — | — |
| Composite (X-9) | 96 | 28 | Sylysia 350 | 40/60 | 55 | 89 | 100 | — | — |
| Composite (X-10) | 50 | Insoluble in water | Sylysia 350 | 40/60 | — | — | — | — | — |
| Composite (X-11) | 88 | 22 | Sylysia 350 | 40/60 | 10 | 20 | 55 | 96 | 100 |

[1]Sylysia 350 (non-spherical silica having an average particle diameter of 3.9 μm and manufactured by Fuji Silysia Chemical Ltd.) A-21 (alumina having an average particle diameter of 50 μm and manufactured by Sumitomo Chemical Company Limited)

[Elution from Composite (X-1) in Water]

The composite (X-1) obtained in the above manner was stirred in water. The stirring started at 150 rpm and continued at the same rate. On the last day of each period shown in Table 1, the composite (X-1) was taken out and evaluated for the rate of elution therefrom in water by the following method.

An amount of 5 g of the composite (X-1) was dispersed in 45 g of distilled water by stirring at 20° C. After stirring for an arbitrary time, the dispersion was separated into a solid part and liquid part by centrifugation. The liquid part was dried and solidified. The proportion of the vinyl alcohol polymer (A) eluted from the composite in distilled water was calculated by the following equation. The results are shown in Table 1. The rate of elution gradually increased and was 46% after 200 days from the start of the stirring in water.

Example 1

In 100 parts of butyl acetate as the solvent (C) was dispersed 10 parts of the composite (X-1) by stirring at ordinary temperature, and thus a paint composition 1 was obtained. The paint composition 1 obtained was applied to the bottom of a ship, and the solvent was volatilized at ordinary temperature. The ship bottom was bathed in seawater at a port in Tamano, Okayama. The status of attachment of aquatic organisms was checked 200 days after the bathing. Almost no aquatic organisms were attached.

The aquatic organism repellent paint composition obtained was evaluated in the following manner. Additionally, the content of the copper element and/or the content of zinc element in the paint composition 1 was measured by a known element analysis method. Specifically, 2 g of the paint composition 1 was put in a platinum crucible and carbonized by heating. Subsequently, sulfuric acid and nitric acid each in an amount of 1 ml were added, and the materials were fully incinerated in an electric furnace (600° C.). Next, the resultant substance was dissolved with 5 ml of hydrofluoric acid and the resultant mixture was evaporated to dryness by heating. After a pretreatment in which the resultant solids were dissolved with 2 ml of hydrochloric acid and the resultant mixture was diluted with distilled water to 25 ml, the measurement was performed by ICP mass spectrometry. The results are shown in Table 2.

[Dispersion Stability of Paint Composition]

When left, the paint composition containing the composite (X) dispersed in the solvent (C) eventually causes precipitation and phase separation. The paint composition produced was left at ordinary temperature for 10 minutes shortly after the production completion in order to evaluate the dispersion stability by visually checking whether the paint composition was separated into a dispersoid phase and solvent phase. The criteria for the evaluation were as follows.

A: Almost no phase separation occurs.
B: The boundary between the phases seems to be at a height of 50% or more and 80% or less of the total height of the dispersion surface.
C: The boundary between the phases seems to be at a height of less than 50% of the total height of the dispersion surface.

Poor dispersion stability of the paint composition causes unevenness of the paint composition applied as a paint and adversely affects the aquatic organism repellent effect.

[Evaluation of Aquatic Organism Repellent Activity]

The status of attachment of aquatic organisms on the ship bottom to which the paint composition had been applied was visually evaluated according to the following criteria 200 days after the application.

A: Almost no aquatic organisms are attached. (Aquatic organisms are attached to less than 30% of the coated surface.)
B: Aquatic organisms are attached to 30% or more and less than 50% of the area of the coated surface.
C: Aquatic organisms are attached to 50% or more and less than 80% of the area of the coated surface.
D: Aquatic organisms are attached to almost the entire area (80% or more of the coated surface).

Examples 2 to 9

Aquatic organism repellent paint compositions were produced and evaluated in the same manner as in Example 1, except for changing the type of the composite (X) or solvent (C). The results are shown in Table 2.

Comparative Example 1

The evaluation was performed in the same manner as in Example 1, except for using the composite (X-8). Because of the lack of the inorganic oxide (B), the dispersion stability of the resultant paint composition was low and many aquatic organisms were attached. According to the result (Table 1) of testing the composite (X-8) for elution in water, elution progressed too quickly. The result indicates that the durability of the resultant aquatic organism repellent paint composition is too low.

Comparative Example 2

The evaluation was performed in the same manner as in Example 1, except for using the composite (X-9). Since the degree of saponification of the vinyl alcohol polymer (A) was too high, the resultant paint composition had such a low dispersion stability that precipitation was likely to be caused and, additionally, many aquatic organisms were attached. According to the result (Table 1) of testing the composite (X-9) for elution in water, elution progressed too quickly. The result indicates that the durability of the resultant aquatic organism repellent paint composition is too low.

Comparative Example 3

The evaluation was performed in the same manner as in Example 1, except for using the composite (X-10). Since the degree of saponification of the vinyl alcohol polymer (A) was too low, the resultant paint composition had a low dispersion stability and, additionally, many aquatic organisms were attached. The vinyl alcohol polymer (A) was not dissolved in water in the formation of the composite. It appears that the poor dissolution led to poor formation of the composite in the first place.

Comparative Example 4

The evaluation was performed in the same manner as in Example 1, except for using the composite (X-11). Since the degree of saponification of the vinyl alcohol polymer (A) was too high, the dispersion stability of the resultant paint composition was low and, additionally, many aquatic organisms were attached. According to the result (Table 1) of testing the composite (X-11) for elution in water, elution progressed quickly, compared to the composites of Examples. The result indicates that the durability of the resultant aquatic organism repellent paint composition is low.

TABLE 2

| | Composite (X) | Solvent (C) | Dispersion stability | Status of attachment of aquatic organisms | Content of copper element (ppm) | Content of zinc element (ppm) |
|---|---|---|---|---|---|---|
| Example 1 | Composite (X-1) | Butyl acetate | A | A | <1 | <1 |
| Example 2 | Composite (X-2) | Butyl acetate | A | A | <1 | <1 |
| Example 3 | Composite (X-3) | Butyl acetate | A | A | <1 | <1 |
| Example 4 | Composite (X-4) | Butyl acetate | B | B | <1 | <1 |
| Example 5 | Composite (X-5) | Butyl acetate | A | A | <1 | <1 |

TABLE 2-continued

|  | Composite (X) | Solvent (C) | Dispersion stability | Status of attachment of aquatic organisms | Content of copper element (ppm) | Content of zinc element (ppm) |
| --- | --- | --- | --- | --- | --- | --- |
| Example 6 | Composite (X-6) | Butyl acetate | A | B | <1 | <1 |
| Example 7 | Composite (X-7) | Butyl acetate | B | B | <1 | <1 |
| Example 8 | Composite (X-1) | Xylene | A | A | <1 | <1 |
| Example 9 | Composite (X-1) | Glycerin | A | B | <1 | <1 |
| Comparative Example 1 | Composite (X-8) | Butyl acetate | C | D | <1 | <1 |
| Comparative Example 2 | Composite (X-9) | Butyl acetate | C | D | <1 | <1 |
| Comparative Example 3 | Composite (X-10) | Butyl acetate | C | D | <1 | <1 |
| Comparative Example 4 | Composite (X-11) | Butyl acetate | B | C | <1 | <1 |

From the above results, it has been confirmed that the aquatic organism repellent paint composition of the present invention has good dispersion stability and is capable of maintaining the repellent effect on aquatic organisms over a long time. Moreover, the aquatic organism repellent paint composition of the present invention is substantially free of any compound including the copper element and/or zinc element, and thus has no risk of environmental pollution.

INDUSTRIAL APPLICABILITY

As shown in EXAMPLES, the aquatic organism repellent paint composition of the present invention has good dispersion stability and the good aquatic organism repellent effect. The paint composition can be adjusted easily. The paint composition is, unlike conventional aquatic organism repellent paint compositions, substantially free of any heavy metal such as copper, and is thus environmentally friendly and capable of reducing waste of metal resources. Therefore, industrial value of the present invention is extremely high.

The invention claimed is:

1. An aquatic organism repellent paint composition, comprising:
a vinyl alcohol polymer (A) having a degree of saponification of more than 65 mol % and less than 88 mol %;
an inorganic oxide (B); and
a solvent (C),
wherein an average particle diameter of the inorganic oxide (B) is in a range of from 1.10 to 50 μm.

2. The composition of claim 1, wherein a 4 mass % aqueous solution of the vinyl alcohol polymer (A) has a viscosity of more than 2.5 mPa·s and less than 150 mPa·s at 20° C.

3. The composition of claim 1, wherein a mass ratio (A)/(B) between the vinyl alcohol polymer (A) and the inorganic oxide (B) is 10/90 to 90/10.

4. The composition of claim 1, wherein the inorganic oxide (B) comprises aluminum oxide or silicon oxide.

5. The composition of claim 1, wherein the solvent (C) has a boiling point of 25° C. or more and less than 250° C.

6. The composition of claim 1, wherein a content of a copper element and/or a zinc element is less than 10 ppm.

7. The composition of claim 1, comprising a composite (X), wherein the composite (X) comprises the vinyl alcohol polymer (A) and the inorganic oxide (B).

8. An aquatic organism repellent coating, comprising a composite (X) comprising:
a vinyl alcohol polymer (A) having a degree of saponification of more than 65 mol % and less than 88 mol %; and
an inorganic oxide (B),
wherein an average particle diameter of the inorganic oxide (B) is in a range of from 1.10 to 50 μm.

9. The composition of claim 1, wherein the degree of saponification of the vinyl alcohol polymer (A) is no more than 85 mol %.

10. The composition of claim 1, wherein the degree of saponification of the vinyl alcohol polymer (A) is no more than 83 mol %.

11. The composition of claim 1, wherein the 4 mass % aqueous solution of the vinyl alcohol polymer (A) has a viscosity of more than 3.0 mPa·s and less than 120 mPa·s at 20° C.

12. The composition of claim 1, wherein a 4 mass % aqueous solution of the vinyl alcohol polymer (A) has a viscosity in a range of from 2.5 to 32 mPa·s.

13. The composition of claim 1, wherein the vinyl alcohol polymer (A) has a ratio of weight-average molecular weight to number-average molecular weight of 5 or less.

14. The composition of claim 1, wherein the vinyl alcohol polymer (A) has a ratio of weight-average molecular weight to number-average molecular weight of 4 or less.

15. The composition of claim 1, having an elution rate in water of 80% or less at 20° C. on a 100th day after a start of stirring in water.

16. The composition of claim 15, wherein the elution rate is less than 60%.

17. The composition of claim 15, wherein the elution rate in water is 90% or less at 20° C. on a 200th day after the start of stirring in water.

18. The composition of claim 15, wherein the vinyl alcohol polymer (A) is a copolymer comprising, in polymerized form, a vinyl ester monomer and a further monomer comprising an α-olefin, an acrylic acid, an acrylate, an acrylamide, an acrylamide derivative, a methacrylamide, a methacrylamide derivative, a vinyl ether, a nitrile, a vinyl halide, a vinylidene halide, an allyl compound, an unsaturated dicarboxylic acid and/or carboxylate, a vinylsilyl compound, and/or isopropenyl acetate.

19. The composition of claim 18, wherein the further monomer is in a range of from 0.1 to 10 mol %.

20. The composition of claim 1, wherein the vinyl alcohol polymer (A) is not crosslinked.

* * * * *